May 22, 1923.
J. C. E. BOURASSA
TRUCK
Filed Nov. 8, 1919
1,455,987
2 Sheets-Sheet 1
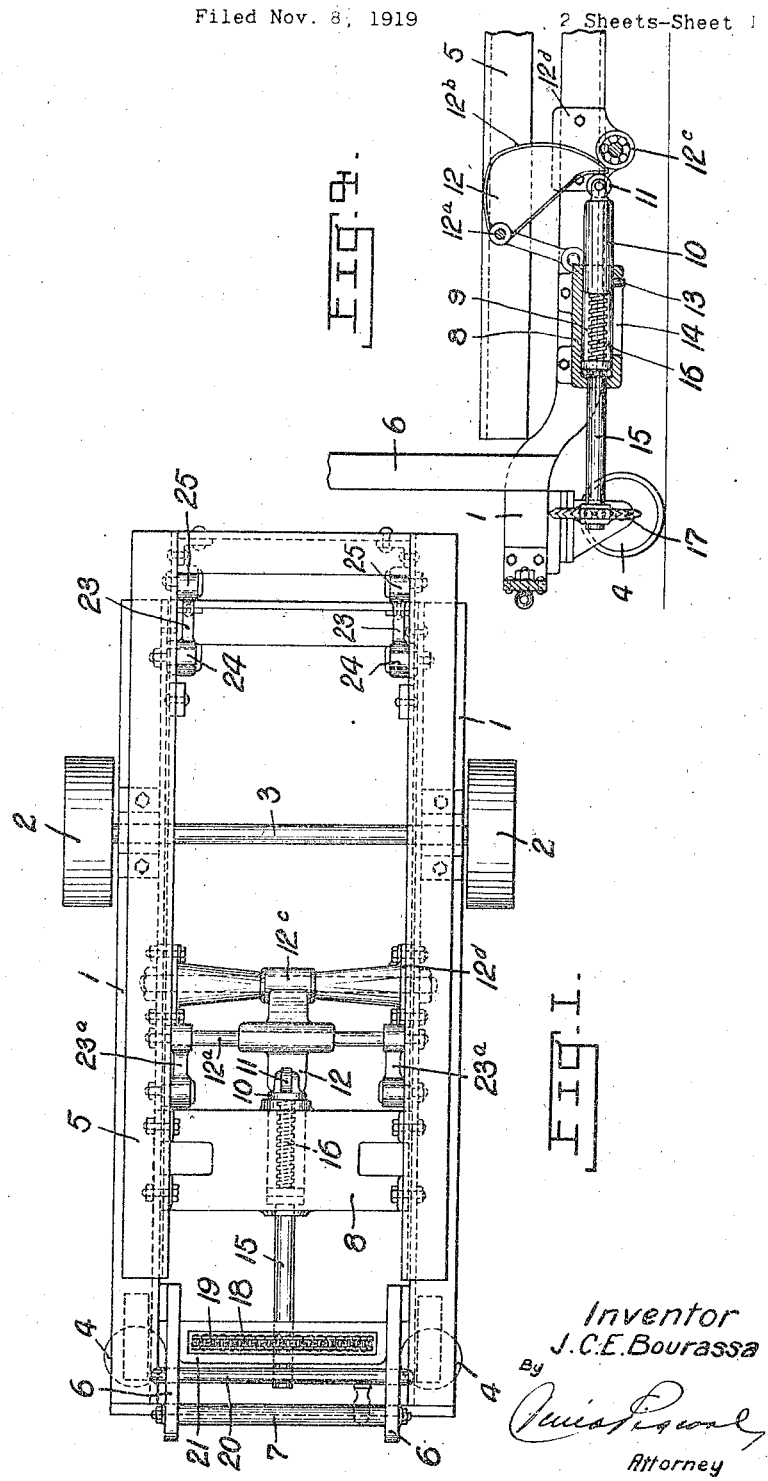
Inventor
J.C.E.Bourassa
By
Attorney

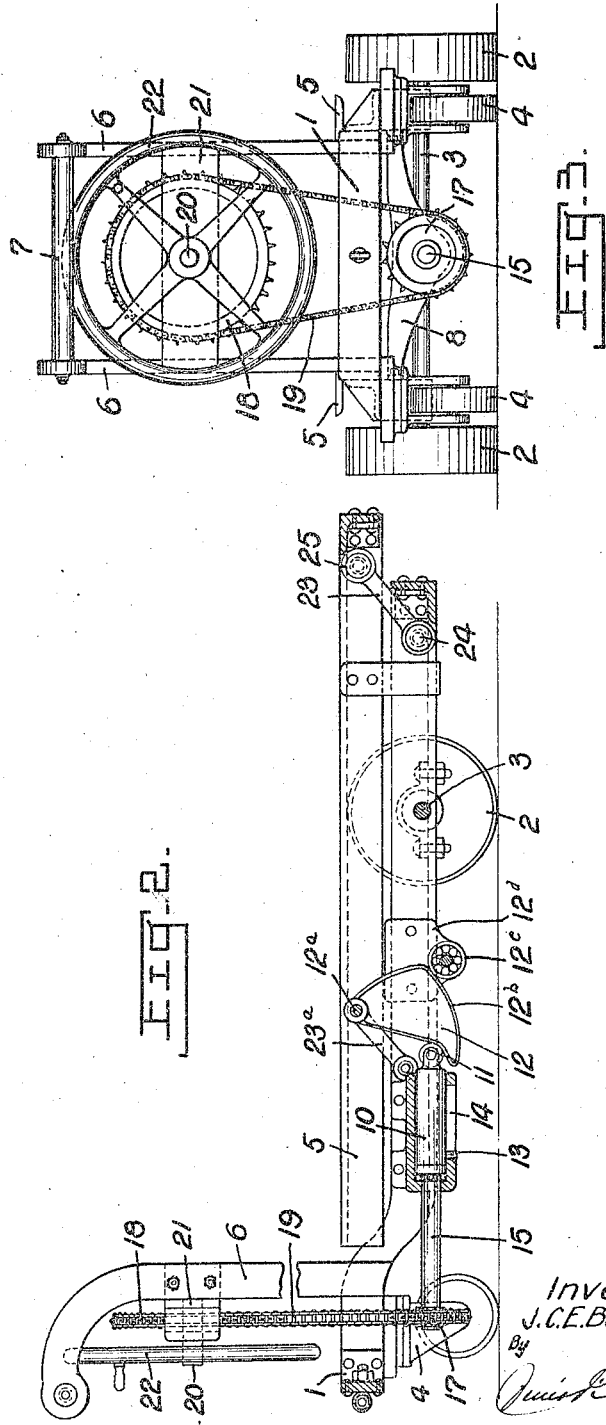

Patented May 22, 1923.

1,455,987

UNITED STATES PATENT OFFICE.

JOSEPH CYRILLE EMILE BOURASSA, OF MONTREAL, QUEBEC, CANADA.

TRUCK.

Application filed November 8, 1919. Serial No. 336,565.

*To all whom it may concern:*

Be it known that I, JOSEPH CYRILLE EMILE BOURASSA, a British subject, residing at #1300 Bordeaux Street, in the city of Montreal, in the Province of Quebec, in the Dominion of Canada, have invented certain new and useful Improvements in a Truck; and I do hereby declare that the following is a full, clear, and exact description of the same.

The present invention relates to improvements in a truck or the like and the main object of this invention is to provide a device of this character whereby a load, which is placed on a platform, may be lifted up and carried away, thus saving time and labor.

The invention will be better understood with the aid of the accompanying drawings in which:

Figure 1 is a plan view of the truck according to the invention.

Figure 2 is a side elevation of the truck in longitudinal section.

Figure 3 is a rear end view of the truck.

Figure 4 is longitudinal section view through the rear end of the truck being shown in its raised position.

Like numerals of reference indicate corresponding parts in each figure.

In the drawings 1 is the main frame preferably rectangular in shape and suitably supported on the wheels 2 mounted on the cross shaft 3, which is journalled in suitable bearings on said frame 1. The wheels 2 are preferably mounted adjacent one end of said frame 1 and on the other end of said frame are provided the pivoted casters 4.

The frame 1 is preferably higher at one end and adapted to receive a frame 5 which may be, if preferred, of the same length of said frame 1. On frame 1 is rigidly secured at one end upwardly projecting arms 6, preferably curved at their upper ends, and 7 is a cross handle secured between the outwardly projecting ends of said arms 6.

Suitably secured below said frame 5 adjacent the rear end is a bracket 8 centrally slotted at 9 and adapted to receive a pusher element 10 which slides therein.

Said pusher element 10 is centrally perforated and provided with a female thread and at the outer end of said pusher is mounted a roller 11 which is adapted to contact with the centrally disposed cam member 12 which is rigidly mounted on the cross-shaft 12ª. The said shaft 12ª is secured in suitable bearings mounted in the sides of the frame 5. This cam member 12 is so made, that it will serve as a lever against which the roller 11 contacts.

The cam member 12 has an eccentric surface 12ᵇ which is adapted to rest against the roller 12ᶜ secured across the frame 1 in suitable bearings 12ᵈ. It will readily be seen that when the said cam element is moved or pushed against said roller 12ᶜ, that it will force the frame 5 upwardly. Thus the most heavy loads can be lifted without difficulty.

At the other end of said pusher 10 is provided a downward projecting pin 13 which slides in the slot 14 provided in the bottom of said bracket 8 and is adapted to regulate the travel of the pusher 10.

15 is a rod which projects through one end of said bracket 8 and is provided with a worm 16 which is made to engage the female thread in said pusher 10. On the outer end of said rod 15 is rigidly mounted a sprocket 17 which is operatively connected to the sprocket wheel 18 by a sprocket chain 19. The sprocket wheel 18 is preferably mounted on the stub shaft 20 which is journalled in the brackets 21 secured intermediate of the arms 6, and 22 is a hand wheel rigidly mounted at one end of said shaft 20.

The frame 5 is movably mounted in relation to said frame 1 and the lifting motion of said frame 5 is obtained by the links 23 and 23ª which are disposed obliquely when in their inoperative position and are pivotally connected at one end by the bolt 24 to the frame 1 and at their other end by the bolt 25 to the frame 5. The links 23ª are rotatably mounted at their upper ends on the shaft 12ª and serve as guides for the movable frame 5.

In the operation of the invention it will readily be seen that in operating the hand wheel 22, the sprocket wheel 18, the sprocket gear 17, the shaft 15 the worm 16 and the pusher 10 will be simultaneously actuated, and the forward travel of the pusher 10 which contacts with the cam element 12 mounted in the frame 5, said element contacting with the roller 12ᶜ (said roller being secured to the frame 1) will cause a lifting motion to the frame 5. The travel of the pusher 10 is limited by the slot 14 and engaging pin 13, and the friction between the end of the said pusher with the cam 12 is lessened by the friction roller 11.

On the frame 5 is preferably provided a platform which is not illustrated in the drawings.

What I claim as my invention is:—

1. In a truck of the class described, a main frame, a superposed frame, swinging links directly connecting said frames, an abutment on the main frame, a cam pivotally suspended from the superposed frame so as to allow its face to rest on said abutment, and means pressing on the cam to cause said face to travel on said abutment.

2. In a truck of the class described, a set of superposed frames, means swingingly connecting the upper frame to the lower frame, an abutment on one frame, a jack screw mounted on the same frame and adjacent the abutment, a cam pivotally connected to the other frame, the cam resting on the said abutment, and means to cause the head of the said jack screw to press the said cam on said abutment and cause the said cam to travel on the said abutment.

3. In a truck of the class described having a frame with wheels supporting the front end and casters supporting the rear end thereof, a bracket connected to the said frame and projecting underneath the same, a screw jack mounted in said bracket, an abutment also mounted on said frame adjacent said screw jack, a second frame superposed on said main frame and swingingly connected thereto, a cam pivoted to the superposed frame and suspended over the main frame between the abutment and the head of the screw jack, and means to operate the screw jack to cause its head to press the cam over the abutment.

Signed at Montreal, Quebec, Canada, this 4th day of November, 1919.

JOSEPH CYRILLE EMILE BOURASSA.

Witnesses:
  C. PATENAUDE,
  M. DENYS.